(12) United States Patent
Krüger et al.

(10) Patent No.: US 10,221,081 B2
(45) Date of Patent: Mar. 5, 2019

(54) UV SENSOR

(71) Applicant: XYLEM IP MANAGEMENT S.À.R.L., Senningerberg (LU)

(72) Inventors: Friedhelm Krüger, Lemgo (DE); Uwe Kanigowski, Velbert (DE)

(73) Assignee: XYLEM IP MANAGEMENT S.ÀR.L., Senningerberg (LU)

( * ) Notice: Subject to any disclaimer, the term of this patent is extended or adjusted under 35 U.S.C. 154(b) by 193 days.

(21) Appl. No.: 15/528,196

(22) PCT Filed: Oct. 22, 2015

(86) PCT No.: PCT/EP2015/074474
§ 371 (c)(1),
(2) Date: May 19, 2017

(87) PCT Pub. No.: WO2016/078865
PCT Pub. Date: May 26, 2016

(65) Prior Publication Data
US 2018/0141830 A1 May 24, 2018

(30) Foreign Application Priority Data
Nov. 21, 2014 (DE) .................. 10 2014 017 188

(51) Int. Cl.
G01T 1/04 (2006.01)
C02F 1/32 (2006.01)
G01J 1/04 (2006.01)
G01J 1/42 (2006.01)

(52) U.S. Cl.
CPC ............... *C02F 1/325* (2013.01); *G01J 1/04* (2013.01); *G01J 1/0403* (2013.01); *G01J 1/0437* (2013.01); *G01J 1/429* (2013.01); *C02F 2201/326* (2013.01); *C02F 2201/3227* (2013.01)

(58) Field of Classification Search
CPC ... C02F 1/32; C02F 1/325; G01J 1/429; G01J 1/0425; G01J 3/0218; G01J 1/04
See application file for complete search history.

(56) References Cited

U.S. PATENT DOCUMENTS

2010/0234684 A1* 9/2010 Blume ............... A61B 1/00165
600/104

FOREIGN PATENT DOCUMENTS

DE 29707052 U1 11/1997
JP 2005144382 A 6/2005
JP 2009112943 A 5/2009
(Continued)

OTHER PUBLICATIONS

International Search Report for PCT/EP2015/074474, dated Nov. 25, 2015, 9 pages.
(Continued)

*Primary Examiner* — David P Porta
(74) *Attorney, Agent, or Firm* — RatnerPrestia

(57) ABSTRACT

An emitter arrangement includes a UV irradiation source, a cladding tube surrounding the UV irradiation source, and a UV-C sensor. The cladding tube has an end face on an open end. The UV-C sensor has a sensitive area, wherein the UV-C sensor is in optical connection with the end face of the cladding tube, so that the sensitive area of the UV-C sensor can detect the UV irradiation emerging from the end face of the cladding tube during the operation of the UV irradiation source.

11 Claims, 1 Drawing Sheet

(56) References Cited

FOREIGN PATENT DOCUMENTS

WO         01/17907  A1    3/2001
WO   2010/135635  A2   11/2010

OTHER PUBLICATIONS

International Preliminary Report on Patentability with Written Opinion for International Application No. PCT/EP2015/074474, dated May 23, 2017, 5 pages.

* cited by examiner

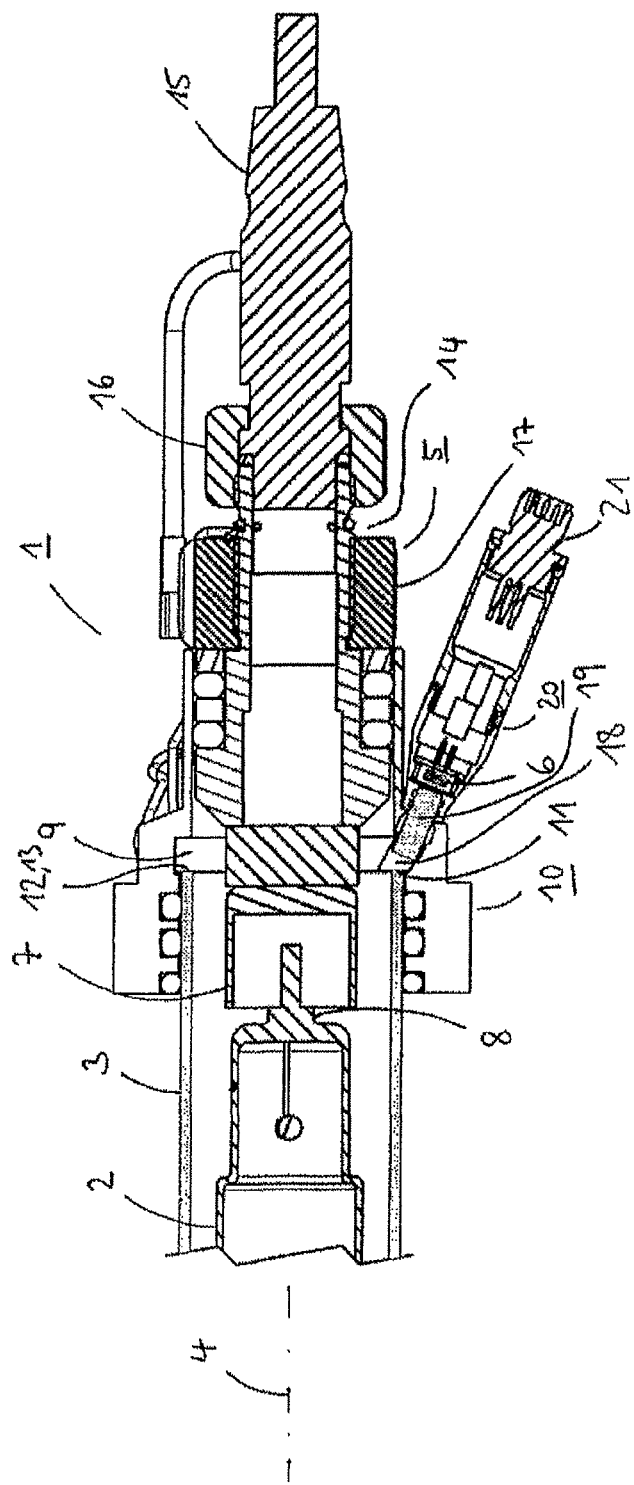

UV SENSOR

CROSS-REFERENCE TO RELATED APPLICATIONS

This patent application is a U.S. National Phase Patent Application of PCT Application No. PCT/EP2015/074474, filed Oct. 22, 2015, which claims priority to German Patent Application No. 102014017188.4, filed Nov. 21, 2014, each of which is incorporated by reference herein in its entirety.

FIELD OF THE INVENTION

The present invention relates to an emitter arrangement and a UV disinfection system.

BACKGROUND OF THE INVENTION

UV emitters have been used for decades for the disinfection of drinking water and waste water, in air conditioning system sumps and for the disinfection of work areas in biological laboratories.

In UV water treatment systems, UV-C irradiation sources are arranged in a quartz glass sheathing tube for irradiating the water. The cladding tube protects the irradiation source from external damage and at the same time ensures an efficient operating temperature.

UV disinfection systems comprise a number of UV emitters, arranged in at least one flow reactor through which the water passes. As it passes through the reactor, the water is subjected to a sufficient dose of UV-C irradiation to achieve the desired effect. A problem here is that the UV emitters are subject to natural ageing. Such ageing, which is associated with a drop in irradiated power, must therefore be monitored so that reliable UV-irradiation of the water is possible. If the irradiated power falls below a minimum, then the emitter must be replaced. The irradiated power given off is monitored by UV sensors.

These UV sensors are conventionally arranged in the flow reactor between the cladding tubes of the emitters and orthogonally to the emitter axes arranged in parallel to one another, so that the measured signal is essentially created through the overlaying of the radiation components from a number of irradiation sources. To allow continuous monitoring of the UV irradiation power across the flow reactor and to improve the operational safety of multi-beam systems, individual emitter monitoring is desirable.

From DE 297 07 052 U1 individual emitter monitoring is known, in which a UV sensor is arranged between the irradiation source and the cladding tube at a small distance from the irradiation source.

SUMMARY OF THE INVENTION

The object of the present invention is to indicate an emitter arrangement and a UV disinfection system, allowing individual detection of the UV irradiation intensity of a UV irradiation source and at the same time simple fitting and removal of the irradiation source.

This object is achieved by an emitter arrangement and a UV disinfection system.

Accordingly, an arrangement comprising a UV irradiation source, a cladding tube surrounding the UV irradiation source, said cladding tube having an end face on an open end, a UV-C sensor having a sensitive area, is provided, wherein the UV-C sensor is in optical connection with the end face of the cladding tube, so that the sensitive area of the UV-C sensor can detect the UV irradiation emerging from the end face of the cladding tube during operation of the UV irradiation source. The UV irradiation from the irradiation source reflected by total reflection in the cladding tube, is measured as it emerges from the end face of the cladding tube. This allows individual detection of the UV irradiation intensity of the UV irradiation source. Since the sensor is arranged outside of the cladding tube, simple fitting or removal of the UV irradiation source is possible.

The cladding tube is preferably cylindrical and has a uniform wall thickness, so that the end face is annular.

In one embodiment, it is provided that the UV-C sensor is part of a sensor unit with an optical probe, wherein the end face of the cladding tube has a line of sight to the optical probe and the optical probe relays the UV irradiation emerging from the end face of the cladding tube to the UV-C sensor. Here it is advantageous if the optical probe is a light guide and is arranged spaced apart from the end face of the cladding tube. It can also be provided that the optical probe is arranged attached to the end face.

In a further embodiment, the UV-C sensor is arranged spaced apart from and with a direct line of sight to the end face of the cladding tube. No optical probe is provided for here. The UV-C sensor directly measures the UV irradiation emerging from the end face of the cladding tube. Here the UV-C sensor can also be arranged attached to the end face of the cladding tube.

The end face of the cladding tube is preferably arranged parallel to a sensitive area of the optical probe and/or sensitive area of the UV-C.

More preferably, the sensor unit comprises an edge filter.

In said embodiments, it is advantageously provided that the cladding tube at its free end is accommodated in a seat of a connecting element, wherein the connecting element defines the position of the cladding tube in relation to the UV irradiation source and seals the cladding tube from the outside.

Here it is preferably provided that the connecting element and the sensor unit in each case have an electrical connection.

Further provided is a UV disinfection system for disinfection of water, having at least one emitter arrangement with at least one of the above features. The UV disinfection system preferably comprises a number of such emitter arrangements, aligned parallel to one another and held jointly by a common retainer.

BRIEF DESCRIPTION OF THE DRAWINGS

FIG. 1 is a longitudinal section through an emitter arrangement. A preferred embodiment of the invention is explained in more detail below using the drawing.

DETAILED DESCRIPTION OF THE INVENTION

FIG. 1 is a longitudinal section through an emitter arrangement 1 according to the invention, with an irradiation source 2, surrounded by a substantially cylindrical cladding tube 3 in UV-permeable material concentrically along its longitudinal axis 4 and comprising a connecting element 5 and a UV-C sensor 6. The connecting element 5 has a sleeve 7, in which a contact base 8 of the irradiation source 2 is accommodated. The sleeve 7 passes through an annular disc 9, which in cooperation with a sealing system 10 surrounding the cladding tube 3 in the area of the sleeve 7 functions as a seat 11 for the cladding tube 3 at its open end 12. The cladding tube 3 has a uniform wall thickness and at its end 12 is cut perpendicularly to its longitudinal axis 4, as a result of which an annular end face 13 forms. The end face 13 at least partially rests against the disc 9. The sealing system 10 seals the cladding tube 3 from the exterior. The sleeve 7 of the connecting element 5 is connected with an electrical connection 14 for a connector plug 15 of the emitter arrangement 1. The connector plug 15 is secured to the connection 14, which is part of the connecting element 5, by means of a union nut 16. A second union nut 17 is provided for mounting the sealing system.

In the area of the seat 11 for the cladding tube 3, the disc 9 has a through-recess 18, in which at least in part an optical probe 19 of the UV-C sensor 6 is arranged. The UV-C sensor 6 is connected via a connecting element 20 with an electrical plug 21.

The light generated by the UV irradiation source 2 is diffracted as it passes through the UV-permeable material of the cladding tube 3. The cladding tube 3 preferably comprises quartz glass. This results, to some extent, in total reflection. Part of the light therefore remains in the cladding tube 3 and is reflected back and forth there. The cladding tube 3 therefore functions as a kind of light guide. The UV irradiation emerges from the end face 13 of the cladding tube 3 and is fed across an air gap by means of the optical probe 19 to the sensor 6. It can also be provided that the optical probe 19 is coupled directly to the end face 13. Furthermore, a direct axial coupling of the sensor 6 to the end face 13 with or without air gap may also be expedient. In all cases, it is advantageous if the UV sensor 6 has an edge filter. In the embodiment presented here only part of the light emerging from the annular end face 13 is used for the measurement.

In another embodiment, it is provided that suitable optical adapters are used, allowing extensive or even total utilisation of the irradiation given off from the end face 13.

The coupling surface of the sensor 6 or of the optical probe 19 does not necessarily have to run orthogonally to the longitudinal axis of the irradiation source 4.

The UV-C sensor 6 preferably has a silicon carbide (SiC) diode.

The UV emitter arrangements can be part of a flow reactor of a UV irradiation system, also referred to as a module. The module has a base plate, which with its underside stands on the floor of a channel through which water flows and a retainer connected therewith, in which the UV emitter arrangements are retained parallel to one another. Here, the UV emitter arrangements are retained with their first ends in the retainer and the other ends standing on the top of the base plate. Here, the connecting elements and the electrical connections protrude from the water.

Following initial installation of a UV disinfection system with a number of UV emitter arrangements according to the invention a normalisation measurement is taken, during which the signal measured by the UV sensors is recorded. This normalisation measurement allows, independently of the abovementioned embodiments, determination of the relative irradiation intensity of the individual emitters in the operation of the system. During operation of a multi-beam system, therefore, a direct comparison of irradiation components of all installed irradiation sources is possible.

The present invention indicates an emitter arrangement, allowing as far as possible individual detection of the UV irradiation intensity of a UV irradiation source.

The decoupled irradiation component is representative of the emitter power and a measure of the radiation flux of the UV irradiation in the water. While here also adjacent irradiation sources contribute a signal component to the measured signal of the UV-C sensor, this component is almost negligible.

Arranging the UV-C sensor outside the cladding tube, in the area of the connecting element, makes the irradiation source simple to replace. The measurement according to the invention of the irradiated power thus takes place independently of outside influences.

The invention claimed is:

1. An emitter arrangement comprising:
   a UV irradiation source;
   a cladding tube surrounding the UV irradiation source, said cladding tube having an open end and an end face on the open end; and
   a UV-C sensor having a sensitive area,
   wherein the UV-C sensor is optically connected to the end face of the cladding tube, so that the sensitive area of the UV-C sensor is configured to detect UV irradiation emerging from the end face of the cladding tube during operation of the UV irradiation source.

2. The emitter arrangement according to claim 1, wherein the cladding tube is cylindrical and has a uniform wall thickness, and the end face is annular.

3. The emitter arrangement according to claim 1, wherein the UV-C sensor is part of a sensor unit with an optical probe, wherein the end face of the cladding tube has a line of sight to the optical probe and the optical probe is configured to relay the UV irradiation emerging from the end face of the cladding tube to the UV-C sensor.

4. The emitter arrangement according to claim 3, wherein the optical probe is a light guide and is spaced apart from the end face of the cladding tube.

5. The emitter arrangement according to claim 3, wherein the end face of the cladding tube is arranged parallel to a sensitive area of the optical probe or a sensitive area of the UV-C sensor.

6. The emitter arrangement according to claim 3, wherein the sensor unit comprises an edge filter.

7. The emitter arrangement according to claim 1, wherein the UV-C sensor is spaced apart from to the end face of the cladding tube and has a direct line of sight to the end face of the cladding tube.

8. The emitter arrangement according to claim 1, wherein a free end of the cladding tube is positioned in a seat of a connecting element, wherein the connecting element defines a position of the cladding tube in relation to the UV irradiation source and seals the cladding tube from the outside.

9. The emitter arrangement according to claim 8, wherein the connecting element and the sensor unit each have an electrical connection.

10. A UV disinfection system for disinfection of water comprising at least one emitter arrangement according to claim 1.

11. The UV disinfection system according to claim 10, comprising a plurality of UV emitter arrangements, aligned parallel to one another and held jointly by a common retainer.

* * * * *